Aug. 7, 1956
J. H. HOLLAND
2,757,859
CHEWING GUM DISPOSER
Filed Nov. 2, 1953
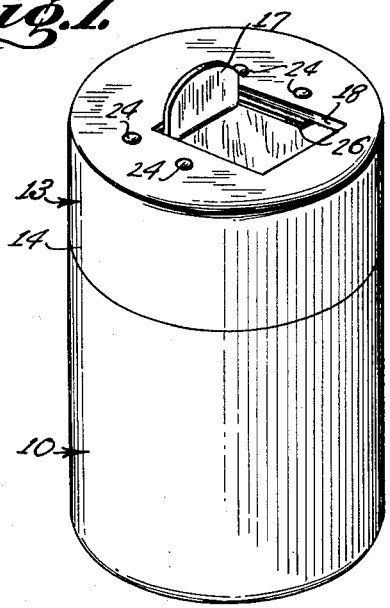
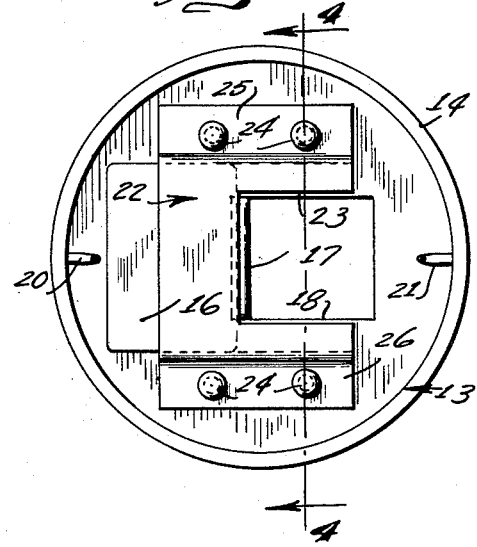
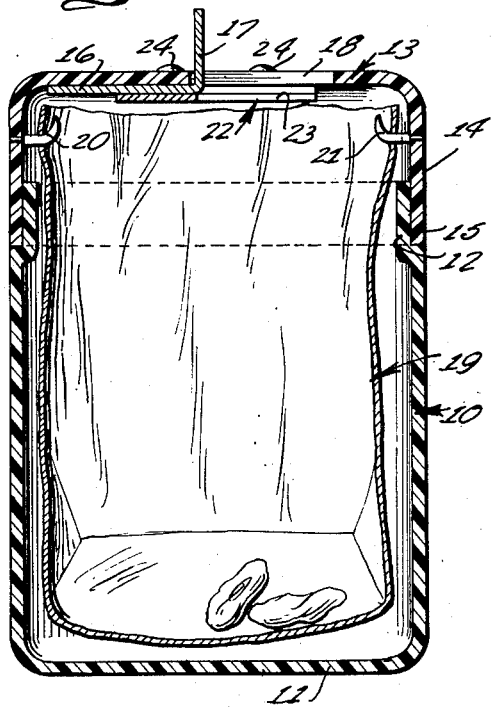
INVENTOR.
James H. Holland
BY Victor J. Evans &Co.
ATTORNEYS

United States Patent Office 2,757,859
Patented Aug. 7, 1956

2,757,859
CHEWING GUM DISPOSER
James H. Holland, Marion, Mich.

Application November 2, 1953, Serial No. 389,736

3 Claims. (Cl. 232—43.2)

This invention relates to receptacles of the type used for receiving used or discarded materials, such as used chewing gum, and in particular a container having a bag or sack suspended therein with an opening having a slidable closure therein in the upper end whereby chewing gum deposited in the opening in the upper end of the container drops into the sack or bag whereby after an accumulation of gum is received in the disposable element the element may readily be removed and replaced.

The purpose of this invention is to provide a receiver into which chewing gum, particularly in restaurants and theatres may be placed to eliminate the general practice of dropping chewing gum on the floor or sticking it on under surfaces of tables, seats, and the like.

The general practice of sticking chewing gum to the under surfaces of chairs, tables, and the like and also of dropping the chewing gum on floors, sidewalks, streets and the like is not only unsanitary, but is objectionable as it is continuously coming in contact with hands and clothing of customers of restaurants and patrons of theaters and invariably it is picked up by soles of shoes. With this thought in mind this invention contemplates a comparatively small sanitary receiver having a disposable element such as a paper bag therein wherein with the receiver positioned on tables in restaurants or at the ends of rows of seats in a theater or at other suitable points, chewing gum might, without hesitancy, be inserted in openings in such receivers and deposited in the disposable element therein whereby with such devices cleaned periodically the used chewing gum may readily be taken care of.

The object of this invention is, therefore, to provide a container having a readily disposable element therein in which the device may be used for receiving used chewing gum.

Another object of the invention is to provide a device for receiving used chewing gum in which the device may readily be sterilized.

A further object of the invention is to provide a used chewing gum disposer that is of a simple and economical construction.

With these and other objects and advantages in view the invention embodies a container having a removable cover in which the cover is provided with an opening and a closure for the opening and in which a disposable element, such as a paper bag is suspended from the cover into the container.

Other features and advantages of the invention will appear from the following description taken in connection with the drawing, wherein:

Figure 1 is a perspective view illustrating the improved chewing gum disposer.

Figure 2 is a vertical section through the disposer with the parts assembled.

Figure 3 is a view looking upwardly toward the under side of the cover of the chewing gum disposer with the base or lower portion of the device omitted.

Figure 4 is a cross section through the cover taken on line 4—4 of Fig. 3 and taken from a point at a right angle to that from which the section shown in Fig. 2 is taken.

Referring now to the drawing wherein like reference characters denote corresponding parts the improved chewing gum disposer of this invention includes a lower container 10 having a base 11 with a continuous side wall extended upwardly from the base and with the side wall provided with an inset portion 12 at the upper end, a cover 13 having a flange 14 adapted to be frictionally held in the recess formed by the inset portion 12, as indicated by the numeral 15, a sliding cover 16 having a tab 17 extended upwardly through an opening 18, and a bag 19 suspended by hooks 20 and 21 on the inner surface of the flange 14 and positioned to hold the bag with the lower portion thereof extended into the lower portion or the container 10.

Although the casing is illustrated as being cylindrical it will be understood that it may be formed of other suitable shapes and although it is shown as being made of plastic it will be understood that it may be made of other materials.

In the design shown the cover 16 is slidably mounted in a track formed with a plate 22 having an opening 23 therein and the plate, which is positioned against the under surface of the cover 13 is secured in position with fasteners 24 which extend through flanges 25 and 26 at the edges of the plate and which are offset to provide a recess 27 in which the plate 22 is positioned.

Although the hooks 20 and 21 are shown as secured to the flange 14 of the cover 13 it will be understood that they may be mounted in other parts of the device.

With the receiver formed and assembled as shown and described it may be placed on a table or suspended from the back of a seat or from a post and as used chewing gum is discarded the cover 16 is actuated by the tab 17 to uncover the opening 18 whereby the chewing gum may be deposited through the opening 18 and into the bag 19. At regular periods a bag in the devices may be removed and replaced with a fresh bag and with the bags chemically treated the device will be sanitary. It will also be understood that with the bags removed the casing may be sterilized by suitable means.

It will be understood that modifications, within the scope of the appended claims, may be made in the design and arrangement of the parts without departing from the spirit of the invention.

What is claimed is:

1. In a chewing gum disposer, the combination which comprises a container having an inset portion at the open end thereof providing an annular recess, a cover having an opening therein frictionally mounted in the annular recess on the open end of said container, a plate having flanges at the opposite ends thereof and an opening therein, means engaging said flanges to secure said plate to said cover so that the opening in the plate is in alinement with the opening in the cover, said plate being offset from said flanges to provide a space between said plate and said cover, a closure slidably mounted in the space between the plate and the cover and positioned to close the openings in the plate and the cover, and a disposable element in the container and positioned to receive products deposited through the opening in the cover thereof.

2. In a chewing gum disposer, the combination which comprises a container having an inset portion at the open end thereof providing an annular recess, a cover having an opening therein frictionally mounted in the annular recess on the open end of said container, a plate having flanges at the opposite ends thereof and an opening therein, means engaging said flanges to secure said plate to said cover so that the opening in the plate is in alinement with the opening in the cover, said plate being offset from said flanges to provide a space between said plate and said cover, a closure slidably mounted in the space between the plate and the cover and positioned to close the openings in the plate and the cover and a paper bag suspended in said container and positioned to receive products deposited through the opening in the cover thereof.

3. In a chewing gum disposer, the combination which comprises a container having an inset portion at the open end thereof providing an annular recess, a cover having an opening therein frictionally mounted in the annular recess on the open end of said container, a plate having flanges at the opposite ends thereof and an opening therein, means engaging said flanges to secure said plate to said cover so that the opening in the plate is in alinement with the opening in the cover, said plate being offset from said flanges to provide a space between said plate and said cover, a closure slidably mounted in the space between the plate and the cover and positioned to close the openings in the plate and the cover, said cover having a pair of diametrically disposed hooks on the inner surface extending inwardly thereof at right angles to said inner surface, and a paper bag suspended by the hooks and positioned to receive products deposited through the opening in the cover of the container.

References Cited in the file of this patent

UNITED STATES PATENTS

| | | |
|---|---|---|
| 1,039,050 | Grubb | Sept. 17, 1912 |
| 1,124,395 | Cottrell | Jan. 12, 1915 |
| 1,169,606 | Blank et al. | Jan. 25, 1916 |
| 1,203,056 | Schilling | Oct. 31, 1916 |
| 1,608,901 | Miller | Nov. 30, 1926 |
| 1,763,907 | Sommers | June 17, 1930 |
| 1,836,297 | Vienna | Dec. 15, 1931 |
| 2,378,774 | Husted | June 19, 1945 |
| 2,475,896 | Husted | July 12, 1949 |